United States Patent
Choo et al.

(10) Patent No.: US 7,573,022 B2
(45) Date of Patent: Aug. 11, 2009

(54) METHOD FOR FABRICATING VERTICALLY-OFFSET INTERDIGITATED COMB ACTUATOR DEVICE

(75) Inventors: Hyuck Choo, Albany, CA (US); David Garmire, El Cerrito, CA (US); Richard S. Muller, Kensington, CA (US); James Demmel, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 129 days.

(21) Appl. No.: 11/492,270

(22) Filed: Jul. 25, 2006

(65) Prior Publication Data
US 2007/0026614 A1 Feb. 1, 2007

Related U.S. Application Data

(60) Provisional application No. 60/703,022, filed on Jul. 27, 2005.

(51) Int. Cl.
*H01J 3/14* (2006.01)
*H01L 29/78* (2006.01)
*G02B 26/08* (2006.01)

(52) U.S. Cl. .............. 250/234; 257/415; 359/198.1
(58) Field of Classification Search ............ 250/234; 257/415; 359/198.1
See application file for complete search history.

(56) References Cited

U.S. PATENT DOCUMENTS

| 5,867,297 | A  | 2/1999  | Kiang et al. |
| 6,285,485 | B1 | 9/2001  | Ferreira |
| 6,331,909 | B1 | 12/2001 | Dunfield |
| 6,347,002 | B1 | 2/2002  | Hagelin et al. |
| 6,603,588 | B2 | 8/2003  | Hagelin et al. |
| 6,628,041 | B2* | 9/2003 | Lee et al. ................. 310/309 |
| 6,758,983 | B2 | 7/2004  | Conant et al. |
| 6,769,616 | B2 | 8/2004  | Fu et al. |
| 6,872,319 | B2 | 3/2005  | Tsai |

(Continued)

FOREIGN PATENT DOCUMENTS

EP    1 227 061 A2    7/2002

(Continued)

OTHER PUBLICATIONS

H. Choo et al, "A Simple Process to Fabricate Self-Aligned, High-Performance Torsional Microscanners; Demonstrated Use in a Two-Dimensional Scanner", Optical MEMS And Their Application Conference, 2005, IEEE/Leos International Conference on Oulu, Finland, Aug. 1-4, 2005 Piscataway, NJ, pp. 21-22.

(Continued)

*Primary Examiner*—Thanh X Luu
(74) *Attorney, Agent, or Firm*—Michaelson & Associates; Peter L. Michaelson; George Wolken, Jr.

(57) ABSTRACT

The present invention relates to systems and methods for fabricating microscanners. The fabrication processes employed pursuant to some embodiments are compatible with well known CMOS fabrication techniques, allowing devices for control, monitoring and/or sensing to be integrated onto a single chip. Both one- and two-dimensional microscanners are described. Applications including optical laser surgery, maskless photolithography, portable displays and large scale displays are described.

4 Claims, 13 Drawing Sheets

U.S. PATENT DOCUMENTS

| | | |
|---|---|---|
| 6,947,189 B2 | 9/2005 | Hagelin et al. |
| 2002/0119589 A1 | 8/2002 | Fischer et al. |
| 2002/0149512 A1 | 10/2002 | Oki |
| 2004/0100679 A1 | 5/2004 | Kuo |

FOREIGN PATENT DOCUMENTS

| | | |
|---|---|---|
| WO | WO 01/88594 A2 | 11/2001 |

OTHER PUBLICATIONS

K.F. Chan et al, "High-resolution maskless lithography", Journal of Microlithography, Microfabrication, and Microsystems, vol. 2, Issue 4, Oct. 2003, pp. 331-339.

P.R. Patterson et al, "A Scanning Micromirror With Angular Comb Drive Actuation", International Conference on Micro Electro Mechanical Systems, 2002, pp. 544-547, Las Vegas, NV, USA.

J. Kim et al, "Microfabricated Torsional Actuator Using Self-Aligned Plastic Deformation", IEEE Transducers, 2003, pp. 1015-1018, Boston, MA, USA.

D.T. McCormick et al, "Multiple Layer Asymmetric Vertical Comb-Drive Actuated Trussed Scanning Mirrors", IEEE/LEOS International Conference on Optical MEMS, 2003, pp. 12-13, Waikoloa, Hawaii, USA.

J.-S. Wang et al, "Fabrication method for elastomer spatial light modulators for short wavelength maskless lithography", Sensors and Actuators: A Physical, vol. 114, Issue 2-3, Sep. 1, 2004, pp. 528-535.

R.A. Conant et al, "A Flat High-Frequency Scanning Micromirror", Hilton Head Solid-State Sensor and Actuator Workshop, 2000, pp. 6-9, Transducer Research Foundation, Cleveland, OH, USA.

H. Schenk et al, "A resonantly excited 2D-micro-scanning-mirror with large deflection", Sensors and Actuators A, vol. 89, (2001), pp. 104-111.

* cited by examiner (1-1 to 1-4)

(i) = moving combs (ii) = oxide shell (iii) = vertically thinned combs (1-5 to 1-6)

(1-7)

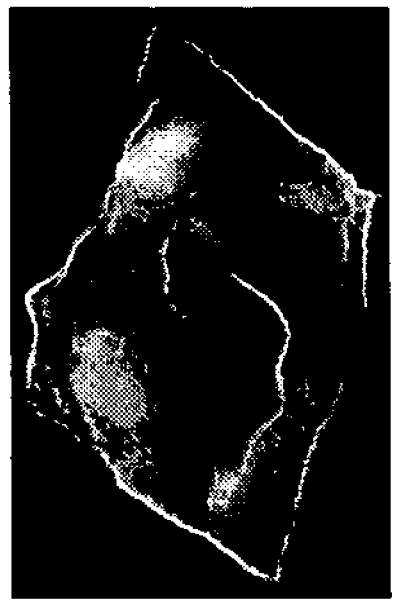
(b)
(a)
Figure 5

METHOD FOR FABRICATING VERTICALLY-OFFSET INTERDIGITATED COMB ACTUATOR DEVICE

CROSS-REFERENCE TO RELATED APPLICATIONS

This application claims priority pursuant to 35 U.S.C. § 119 from provisional patent application Ser. No. 60/703,022 filed Jul. 27, 2005. The entire contents of said provisional patent application are incorporated herein by reference for all purposes.

STATEMENT REGARDING FEDERALLY SPONSORED RESEARCH OR DEVELOPMENT

This invention was made in part with Government support under National Science Foundation Grant (Contract) EEC-0318642 and/or TR-22325. The Government has certain rights to this invention.

FIELD OF THE INVENTION

The present invention relates to microscanners, including structures, methods for fabricating microscanners and applications of microscanners, and more particularly, to microscanners and microscanner fabrication methods compatible with CMOS devices and CMOS fabrication methods.

BACKGROUND OF THE INVENTION

Scanners are used in many applications including, for example, barcode readers, laser printers, confocal microscopes, fiber-optic network components and numerous other uses. Additional scanner applications are continually being developed. However, typically macro-scale scanners have several challenges with which to deal including relatively slow scanning speed, large power consumption, high cost, and large size (rendering them unsuitable for use in portable devices), among other disadvantages. In an attempt to address these and other issues with macro-scale scanners, the design, development, and fabrication of microscanners have become an active area of research and development. In some cases, the microscanners may be fabricated from Micro Electro Mechanical Systems (MEMS). However, some of these systems may suffer from slow scan speed, poor resolution, and complicated, costly or unreliable fabrication processes. In addition, many MEMS fabrication procedures for microscanners are incompatible with typical CMOS fabrication procedures, making it difficult to integrate microscanners with CMOS electronics on a single chip. Therefore, a need exists in the art for microscanners that address one or more of these issues, including a need in the art for improved microscanner designs, structures and methods of fabrication and for additional applications of such scanners.

SUMMARY OF THE INVENTION

Accordingly and advantageously the present invention includes fabrication methods for the manufacture of MEMS microscanner devices. The devices typically employ interdigitated comb actuators and may be fabricated using manufacturing processes and equipment that may be compatible with complimentary metal-oxide semiconductor (CMOS) integrated circuit (IC) fabrication techniques. Robust and reliable microscanners are thereby produced. Furthermore, since the mass of the scanning mirror is typically much less than that of conventional scanners, higher speeds in operation and more rapid response times may be anticipated.

In some embodiments of the present invention, CMOS-compatible fabrication methods are employed for creating vertically offset comb actuators as typically used in connection with MEMS microscanner devices.

Some embodiments of the present invention relate to applications of microscanners in tissue-ablation processes such as refractive surgery for vision correction or other medical purposes.

Some embodiments of the present invention relate to applications of microscanners in direct, maskless lithography.

Some embodiments of the present invention may employ precise amplitude control using on-chip integrated CMOS circuitry, making use of CMOS-compatible fabrication processes.

Some embodiments of the present invention may employ circular raster scanning which may be used, for example, for ocular refractive surgery, maskless lithography processes, as well as other applications.

Some embodiments of the present invention may improve performance, reliability, and lifetime of microscanners using temperature sensors such as, for example, resistance-temperature detectors (RTD) integrated with the microscanner structure.

Some embodiments of the present invention comprise applications of microscanners in portable scanning display systems as may be usable, for example, in wrist-watches, cell phones, laptop computers, PDAs and similar devices. Such increased functionality could be used, for example, to use a laptop computer as portable projection device, facilitating meetings, discussion groups and the like.

Some embodiments of the present invention relate to microscanners suited for use in large flat-panel or slim-panel display systems employing one or more microscanners.

These and other advantages are achieved in accordance with the present invention as described in detail below.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not to scale.

The techniques of the present invention can readily be understood by considering the following detailed description in conjunction with the accompanying drawings, in which:

FIG. 5 (a) Original 3-D surface profile of a US dime, (b) 3-D diagram of small-spot ablation replicating the dime surface using microscanners pursuant to some embodiments of the present invention (depicting a peak-to-valley height difference of approximately 93 µm).

DETAILED DESCRIPTION OF THE INVENTION

After considering the following description, those skilled in the art will clearly realize that the teachings of the invention can readily be utilized in the field of microscanners, including materials and structures for microscanners, materials, methods and systems for the fabrication of microscanners, systems that include microscanners and applications of microscanners.

Some embodiments of the present invention relate to microscanner fabrication processes that are compatible with complimentary-metal-oxide-semiconductor (CMOS) process, well-known for the fabrication of integrated circuits. Typically, to be CMOS-compatible, fabrication processes should not require elevated temperatures, that is temperatures above about 500° C. Such compatibility is advantageous for several reasons including; the applicability of well-developed CMOS fabrication technologies as components of microscanner fabrication procedures, the ability to fabricate electronic components on the same substrate as the microscanner, thereby facilitating integrated manufacture and assembly, control, sensing and performance monitoring of the microscanner, less costly fabrication of microscanners, among other advantages.

Figure 1:
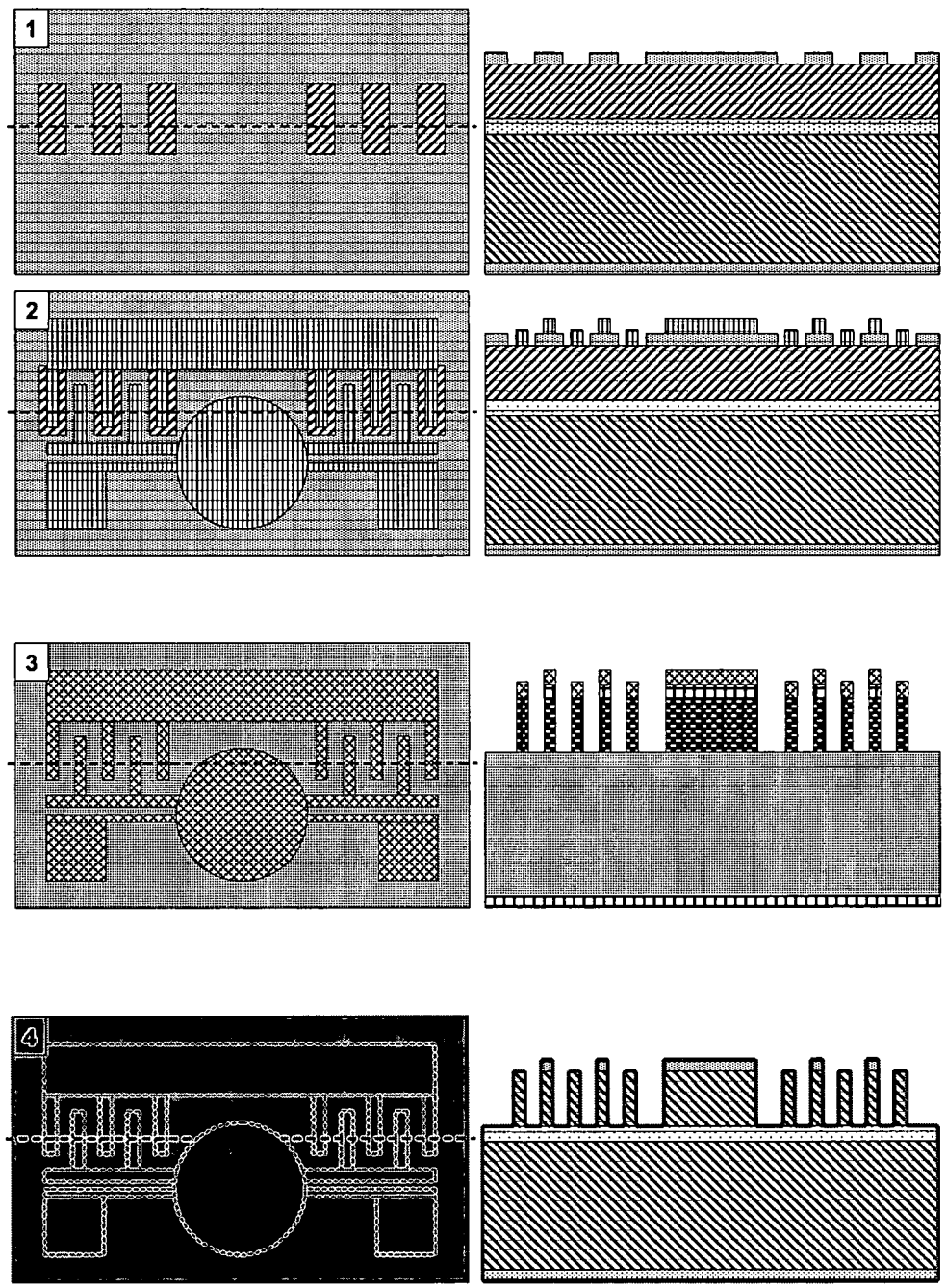
FIG. 1 (parts 1-7) is a schematic depiction of a typical fabrication process in top view (left column of figures) and in cross-sectional view along the dotted lines (right column).
Figure 1:
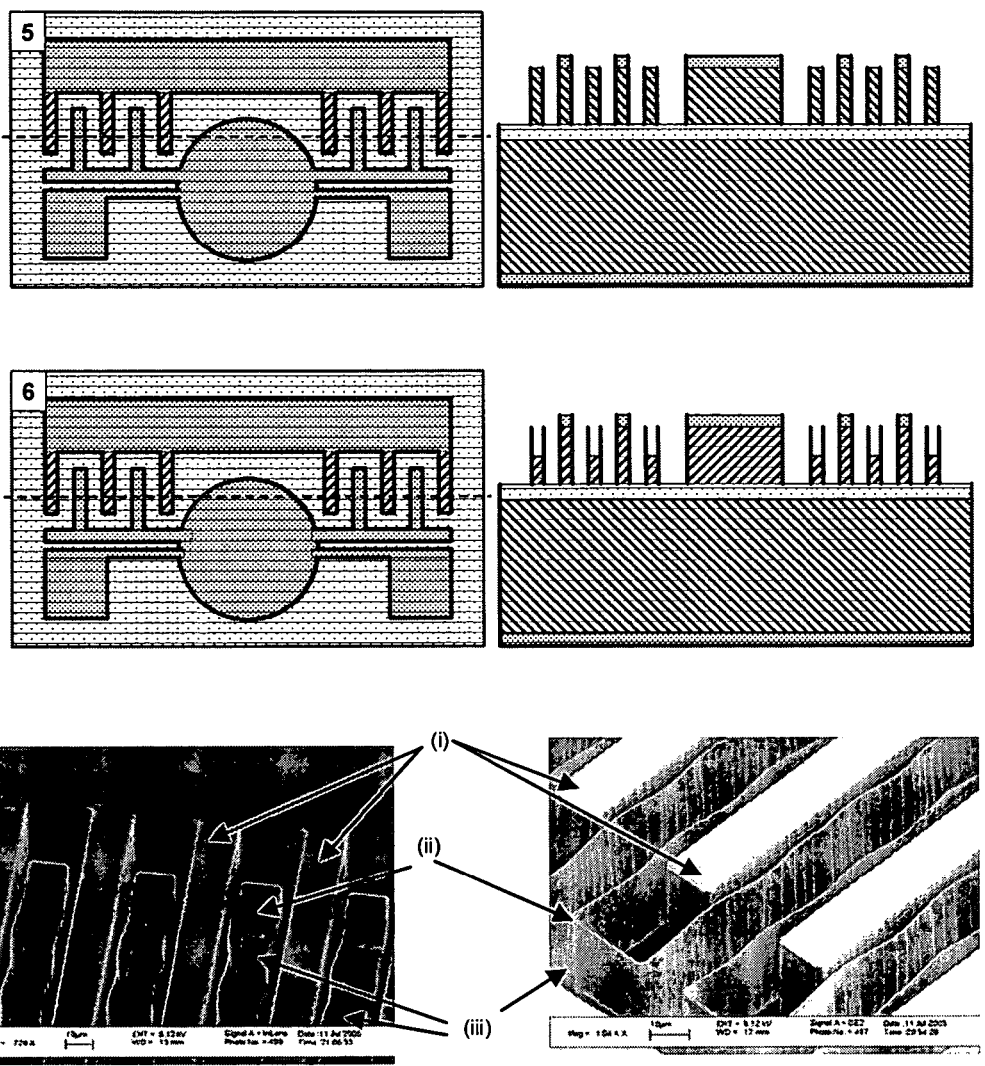
Figure 1:
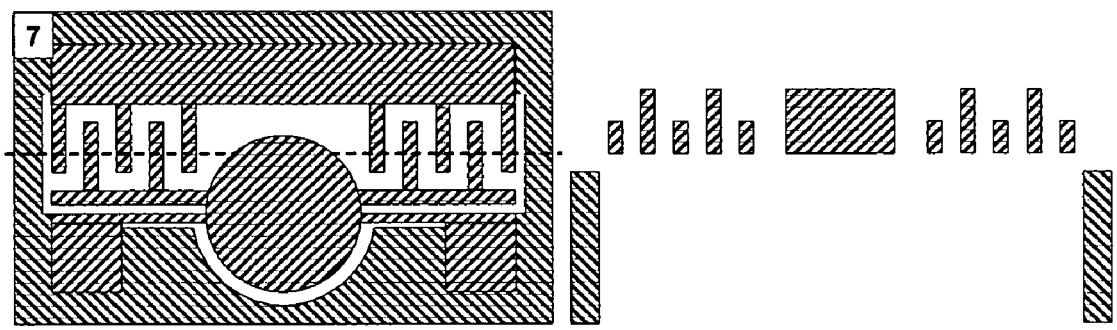

FIG. 1 (parts 1-7) depicts steps used in a typical method for fabricating the microscanners pursuant to some embodiments of the present invention.

FIG. 1-1 depicts the growth or deposition of a thermal oxide or low-temperature oxide (LTO), advantageously having a thickness of about 0.5 µm (µm=micrometer=$10^{-6}$ meter). These steps can be carried on in a manner that renders them consistent with a CMOS-compatible process. A first photolithography mask is advantageously employed to pattern and remove the thermal oxide selectively where the fixed combs will be fabricated. Typically, "thermal oxide" and LTO are interchangeable. However, to keep the fabrication CMOS-compatible, LTO's are typically used in some embodiments of the present invention. In other cases, one can use either thermal oxide or LTO based on availability and other factors.

Following the patterning of the thermal oxide as depicted in FIG. 1-1, a second photolithography mask is advantageously used to create other aspects of the microscanner structures including, but not limited to, moving and fixed combs, flexures, mirrors and the like. A typical example of the fabrication of such exemplary structures is presented in FIG. 1-2.

Figure 2:
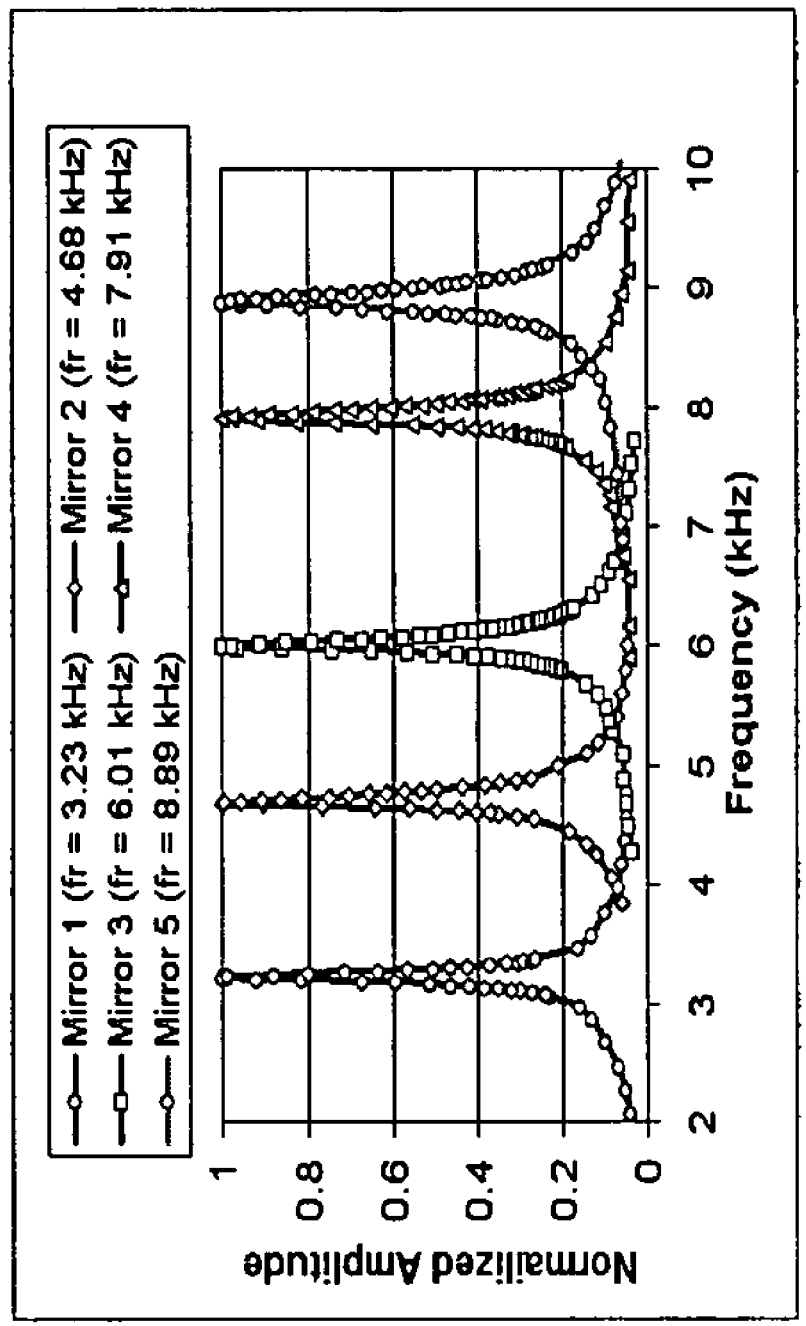
FIG. 2 depicts the frequency response of five different microscanners: The amplitude of each microscanner is normalized with respect to its own peak amplitude.
Figure 3:
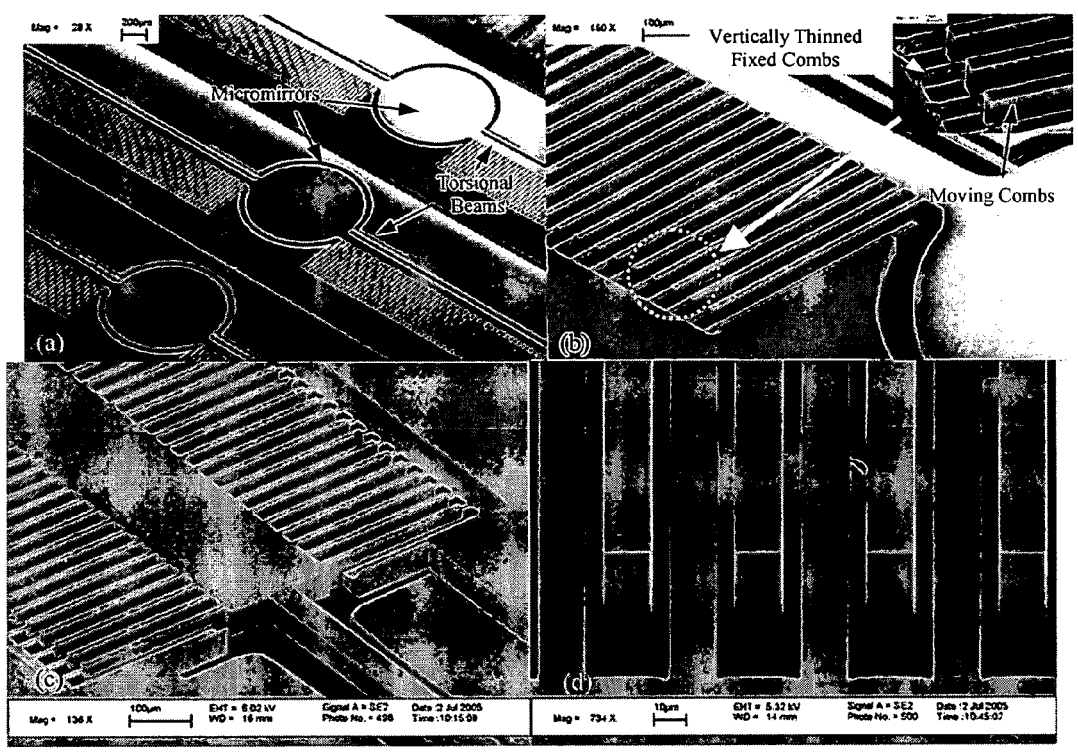
FIG. 3 (a) presents SEM (scanning electron microscope) photos of microscanners (depicting a device layer thickness of about 30 μm); (b) indicates the formation of offset combs (depicting a gap between combs of about 5 μm width and the offset height is about 15 μm); (c) SEM photos of a microscanner (depicting a device layer thickness of about 50 μm); and (d) the formation of offset combs (depicting a gap between combs of about 5 μm width and the offset height is about 25 μm).

FIG. 1-3 depicts the use of a typical process, for example deep-reactive-ion-etch (DRIE), to define a typical microscanner structure in the device layer.

FIG. 1-4 depicts the removal of the photoresist layer and deposition of a thin layer (typically about 0.2 µm in thickness) of LTO.

FIG. 1-5 depicts one example of how a timed-anisotropic-plasma etch step may be used to remove the thin (approximately 0.2 µm) LTO from top-facing surfaces.

FIG. 1-6 depicts one example of how a timed-anisotropic or isotropic silicon-etch step may be used to create a set of vertically thinned combs. The formation of vertically offset combs and remaining oxide shells are visible in the SEM photo directly below FIG. 1-6.

FIG. 1-7 depicts the use of a third photolithography mask to pattern and open the backside of the microscanner structure. The microscanner structure may be released by the use of HF. Following the HF release step, it is advantageous to use critical point drying so as to reduce or avoid stiction between moving and fixed comb fixtures or the moving structure and the substrate.

In some embodiments of the present invention, a CMOS-compatible process carried out on silicon-on-insulator (SOI) wafers, may be used to build high-performance torsional microscanners having vertically offset, interdigitated comb actuators. The process may also be carried out on substrates other than wafers. Exemplary substrates may comprise, glass, ceramic, plastic, flat panels, and the like. In some embodiments of the present invention, the microscanner fabrication process may use three photolithography masks: typically, two to form the front-side microscanner structures and a third to define the backside openings as previously discussed and illustrated in FIG. 1. Both the moving and fixed combs are typically self-aligned and fabricated in the same device layer (typically about 30 µm in thickness). The offset combs may be created by reducing the thickness of the fixed combs, while not substantially reducing the thickness of the moving combs, or the other way around. That is, the moving combs may be thinned while leaving the fixed combs unprocessed. However, it is typically advantageous to thin the fixed combs so that any variations in the thinning process will have no significant effect on the mass of the moving structure. Variations in the mass of the moving structure can affect the performance of the device such as changing the resonant frequency, the quality factor and other performance criteria, an undesirable consequence.

Typically, the process may begin by forming a thermal oxide or LTO layer on the wafer having a thickness in the range from approximately 0.5 µm to about 1.0 µm, and selectively removing the (approximately) 1 µm thick thermal oxide or LTO to open rectangular windows at locations where the fixed combs are to be defined (FIG. 1-1), typically using a first photolithography mask. Subsequently, both fixed- and moving-comb sets may be defined simultaneously with a second photolithography mask. This may be followed by a DRIE step (FIGS. 1-2 and 1-3). Subsequently, a timed-etch step in the DRIE-etcher may be performed to obtain the desired vertical thickness for the fixed combs (FIG. 1-6) without significantly affecting the thickness of the moving combs.

The minimum gap between comb fingers may be as small as approximately twice the alignment accuracy of the photolithography process, which is typically less than or equal to about 0.4 µm for photolithography (for many existing CMOS fabrication facilities). However, current photolithography machines (for example, Nikon NSR-S609B) seem capable of achieving alignment accuracy of about 7 nm (nm=nanometer=$10^{-9}$ meter)), which results in gaps as small as about 0.014 µm. Also, ASML's TWINSCAN XT:1900i has 40 nm resolution with an overlay specification (alignment accuracy) of 6 nm.

The uniformity of the offset heights between the fixed and moving combs as a result of the timed-etch process may be influenced by the performance of the DRIE machine. As an example, using a chopped-gas (or DRIE) etcher, the overall variation in offset heights across a 4-inch wafer below may be controlled to about 1.02% (about 0.15 µm) of the average value (15 µm) as illustrated in Table I. This value is smaller than the typical thickness fluctuations (typically in the range from about 0.5 µm to about 2 µm) that may be found in the MEMS device layers (typically about 10 µm to about 100 µm in thickness) of SOI wafers. It will be understood by those skilled in the art that the methods described for the present example using a 4-inch wafer may be extended to larger substrates including 12-inch substrates and beyond without undue experimentation due to the technological maturity of IC process equipment for larger substrates. The use of the 4-inch wafer in this example is not a limitation of the methods employed in the exemplary embodiment.

The relative simplicity of this fabrication method and its straightforward use of well-established IC processing tools may provide excellent uniformity, performance, and reliability in the comb-drive characteristics as well as high fabrication-processing yields. These methods have been used to design and build microscanners having torsional resonant frequencies between approximately 64 Hz and 24 kHz (kHz=kiloHertz) and maximum optical-scanning angles between about 8 degrees and 70 degrees with actuation voltages ranging from about 10 V to about 51.8 V (ac voltages, root-mean-square values). FIG. 2 illustrates the frequency response measured for five different microscanners. Two separate fabrication runs have been completed for the data shown and achieved yields of operating devices better than 75%. Typically, damage to the microscanners often occurred during the release/rinsing/critical-point-drying steps comprising an HF etchant due to rough handling, and thus, can be improved with more careful treatment of the devices undergoing fabrication. The final structure release may also be carried out using other types of processing techniques, including sublimation drying, among others. SEM photos of exemplary structures are illustrated in FIG. 3.

TABLE I

| Center | Left | Right | Top | Bottom |
|---|---|---|---|---|
| 1.53% | −1.38% | 0.13% | 0.90% | −0.28% |

The high performance and excellent yield of these self-aligned, vertically offset scanners, and the processes for their fabrication, generally result from the improved and simplified fabrication technology as compared to technologies reported in previous research. Fabrication challenges encountered in this earlier work include: (a) the need for critical-alignment steps in a two-wafer process [1]; (b) a need to control and replicate the properties of materials like photoresist or bimorph layers when they are used for hinges [2]; (c) a need for post-process annealing in a high-temperature furnace following the hand assembly of lid and device chips [3]; and (d) a need to deposit multiple-masking layers (composed of silicon dioxide and silicon nitride) to create offset combs [4].

The fabrication techniques described herein may be CMOS compatible because all steps may be performed at low temperatures (typically less than about 450° C. to about 500° C.), and well-established IC processing tools may be employed in a straightforward manner. In addition, integrating resistance-temperature detector(s) on mirror surfaces as described herein, (typically using thin metal films such as platinum, gold, copper aluminum among others), as well as depositing anti-reflection coating(s) on mirror surfaces, are low-temperature process (typically carried out at temperatures less than about 200° C.) and are also CMOS compatible. The fabrication techniques as substantially described herein can be used either to produce a one dimensional (linear) microscanner or to produce a 2-dimensional (2-D) scanner on a single chip.

The microscanners pursuant to some embodiments of the present invention may be especially well suited for applications to refractive laser surgery of ocular corneas where small spot size and high scan speeds may be important assets. These uses of microscanners are examples of applications in which scanning in more than a single direction is called for. That is, one-dimensional (1-D) scanning results when light is reflected from a surface that rotates about a single axis of rotation. One can achieve scanning in more than one dimension by the serial use of two (or more) scanners. However, some embodiments of the present invention permit the fabrication on a single chip of 2-D microscanners.

Figure 10:
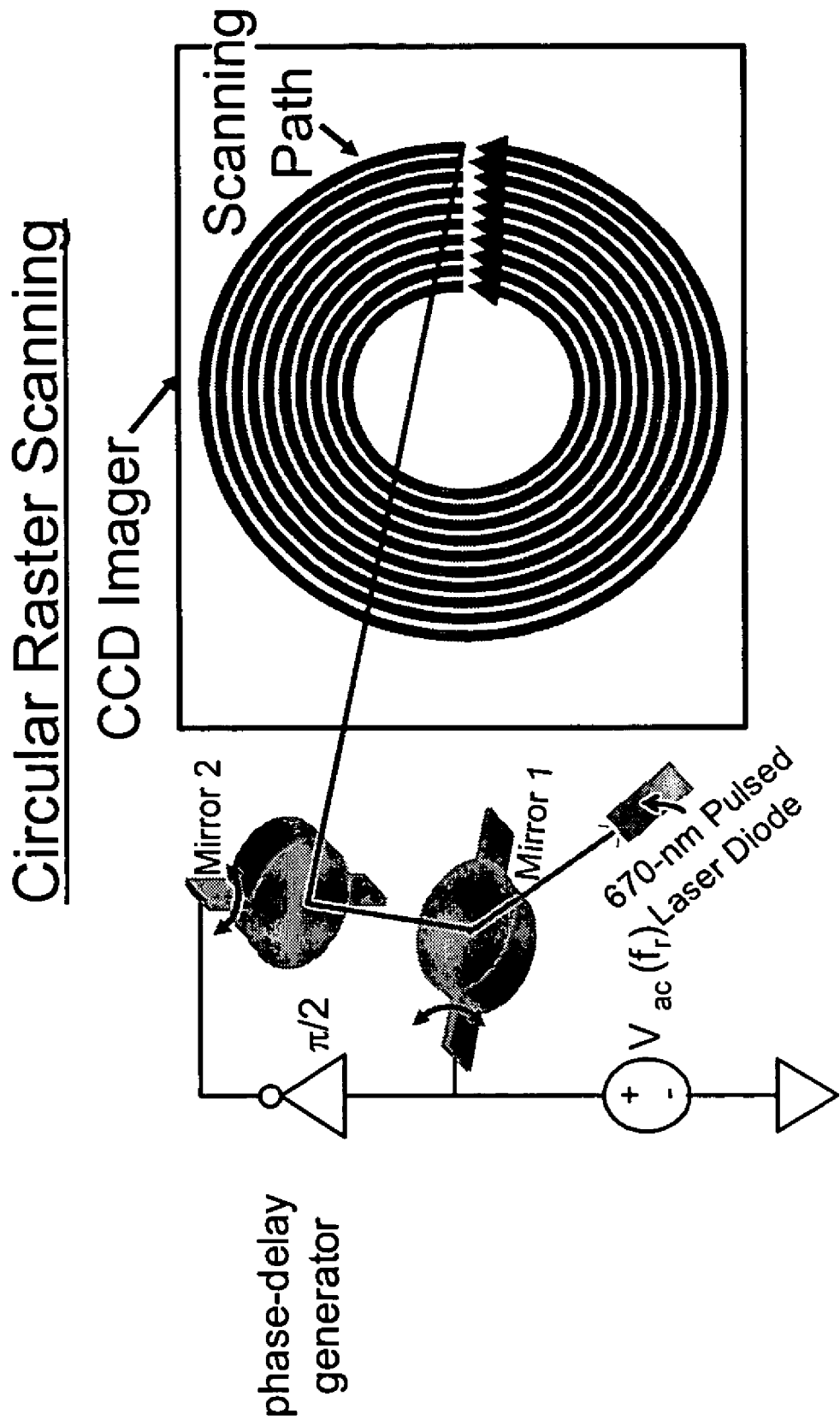
FIG. 10 is a schematic depiction of one example of a system for circular raster scanning pursuant to some embodiments of the present invention.

However, in order to demonstrate the applicability of microscanners to two (or higher) dimensional scanning, a two-dimensional scanning system was assembled by orienting two identical microscanners at right angles to one another, mirror diameter=1 mm, resonant frequency=6.01 kHz) and scanned by a pulsed laser beam (670 nm wavelength (nm=nanometer)). A schematic depiction of such a system using two 1-D microscanners is given in FIG. 10. The cross-coupled scanners were driven by two 6.01 kHz sine waves that were 90 degrees out of phase, producing circular patterns having radii fixed by the amplitude of the driving voltage. The laser spots forming the pattern persisted for 0.4 µsec (microsecond) and had a 220 µm diameter (full width half maximum) as measured with a charge-coupled-device (CCD) optical sensor. The CCD sensor, used in place of an ocular cornea, allows one to assess the performance of the system. Refractive laser surgery is a cumulative ablation process [5]. To model the real process, one may capture the scanning pattern at each CCD frame and then add the intensity profiles to calculate a sum which is proportional to the final ablation pattern. Typically, the period of time to complete an optical laser surgery procedure may be shorter than about 20 minutes, making it reasonable to measure the repeatability and stability of this embodiment of this system over a period of 30 minutes. The results are shown in Table II, giving typical repeatability of the ablation-pulse locations (standard deviations of centroids) and stability of pulse diameters (standard deviations of diameters) for five different locations in the ablation zone.

TABLE II

| | Location | | | | |
|---|---|---|---|---|---|
| | Center | Top | Left | Bottom | Right |
| Centroids (Std Dev) | 0.06 µm | 0.49 µm | 0.55 µm | 0.47 µm | 0.56 µm |
| Diameters (Std Dev) | 0.58 µm | 0.64 µm | 0.68 µm | 0.63 µm | 0.60 µm |

Figure 4:
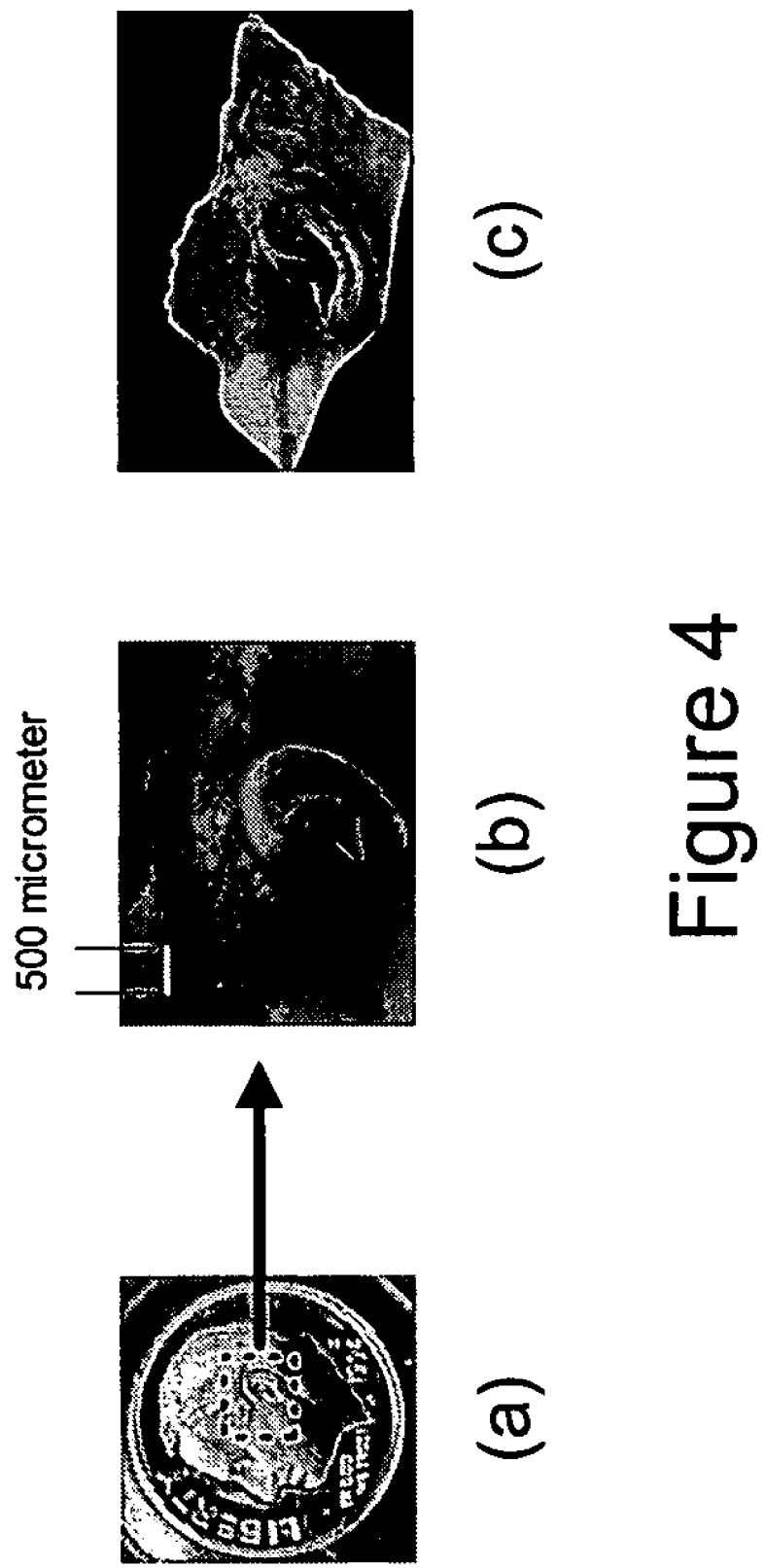
FIG. 4 (a) photo of a US ten-cent coin or dime (master pattern), (b) gray-scale image and (c) 3-dimensional profiles in the region of interest indicated by the dotted box indicated in FIG. 4-a. The measurements depicted were done with a white-light interferometer, for example, WYKO Model NT 3300.

The system shows excellent repeatability in pulse position (standard deviation less than about 0.56 μm) as well as in pulse diameter (standard deviation less than about 0.68 μm) in the zone surrounding the target point for the ablating laser as indicated in Table II. To demonstrate the versatility of the area scanner, a small pattern from the surface topography found on a US Roosevelt dime has been emulated as indicated in FIG. 4. An ablation pattern has been collected over a 40-minute interval as indicated in FIG. 5. The resultant pattern compares favorably with similar emulations of such ablation patterns as found in the research literature [6].

The photoresist exposure process used as part of photolithography is similar to the ablation procedures used for ocular refractive surgery because each is an energy-cumulative process. Hence, maskless, direct photolithography may be another suitable application for the microscanners pursuant to some embodiments of the present invention. The experimental setup and procedures for maskless photolithography (MP) are similar to those used for the refractive surgery application discussed previously. Maskless photolithography may be accomplished using x-y raster scanning, circular raster scanning, among other methods. Compared to the conventional binary-mask photolithography process, MP may have certain advantages. For example, new photolithography patterns may be readily tested without incurring the expense or delay of generating new mask sets. Operators only need to enter the new photolithography patterns into the computer that drives and controls the MP system. In addition, locally confined photolithography problems (such as underexposure problems or removing unwanted features) may be easily corrected or modified without removing and recoating the photoresist layer, typically by reprogramming the scanning and/or exposure procedures. Also, MP on a deeply trenched surface may be performed as long as the width of the trench is sufficiently large in comparison with the minimum achievable spot size. In addition to the advantages listed above, MP is also capable of cumulative exposure similar to the refractive surgery application discussed previously. Typically, one may create sloped or curved photoresist surfaces using an MP system by spatially varying the exposure level. As a result, MP may replace very expensive, calibration-sensitive, gray-scale masks used to produce structures with curved or sloped profiles (such as microlenses and pyramids). Considering the facts that each gray-scale mask can cost several thousands of dollars and that its fabrication requires a slow e-beam writing process, the cost/time advantage of MP systems may be easily understood.

Previous MP using micromirror arrays (such as the Texas Instruments' Digital Micromirror Devices, TI-DMD or similar devices), typically use each micromirror as an individual pixel functioning as an on-off switch [7, 8]. The TI-DMD and other micromirror arrays typically are manufactured by processes having low yield rates, which results in high cost. In addition, the minimum feature size achieved using the TI-DMD is approximately 1.5 μm, which is approximately 3 times larger than the minimum feature size expected to result from the present MP system using larger torsional microscanners.

The quality of the final results of the applications described herein derives in large part from the ability to control the beam dynamics (frequency of operation, amplitude, and position) very precisely. Since the mirror-fabrication process that has been described is CMOS compatible, one may integrate sophisticated sensing and control circuits, controllers, on an SOI wafer before forming the micromechanical part on that same wafer. The sensing circuits may monitor the amplitude and frequency of the torsional microscanners. The signals may be used in a closed loop or open loop control scheme to control the torsional microscanner with improved precision.

Conventional raster scanning typically requires scanners of two different resonant frequencies: one is typically very slow (for example, approximately 60 Hz) and the other is typically very fast (for example, greater than about 10 kHz). In some embodiments of the present invention, methods for scanning a pattern using two scanning mirrors of similar resonant frequencies have been developed. A phase difference of 90 degrees between two identical mirrors may be employed to generate a circular scanning pattern. By varying the voltage of the driving signal, one may modulate the radius of the scanning circle. This method for control of the ablating beam may have a great advantage over conventional raster scanning if the range of resonant frequencies of the available mirrors is limited. Additionally, the method may work very efficiently for scanning targets that naturally have circular geometry such as human ocular corneas or silicon wafers used in semiconductor device fabrication.

Figure 6:
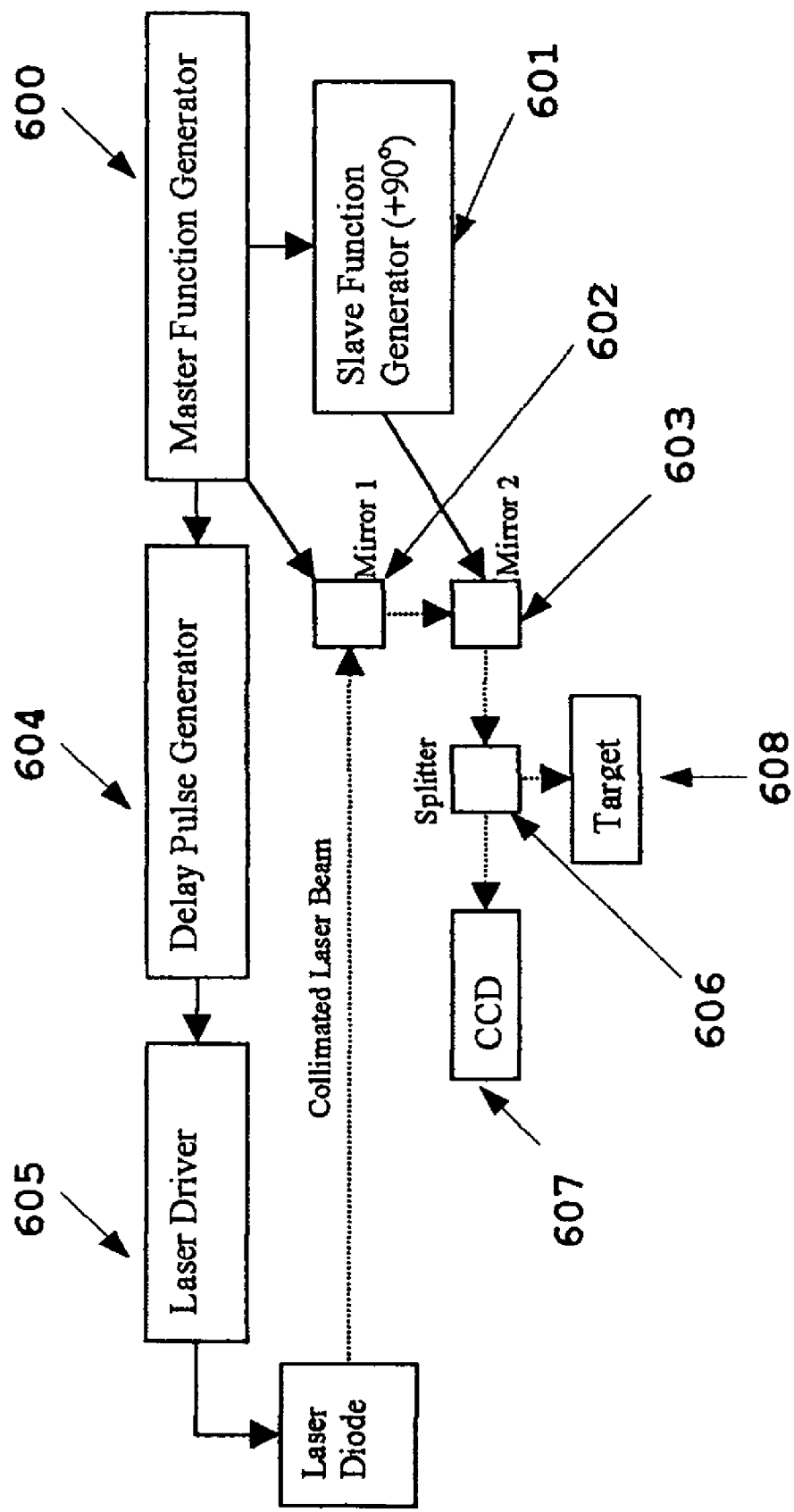
FIG. 6 is a schematic representation of a microscanner system used in some embodiments of the present invention.
Figure 7:
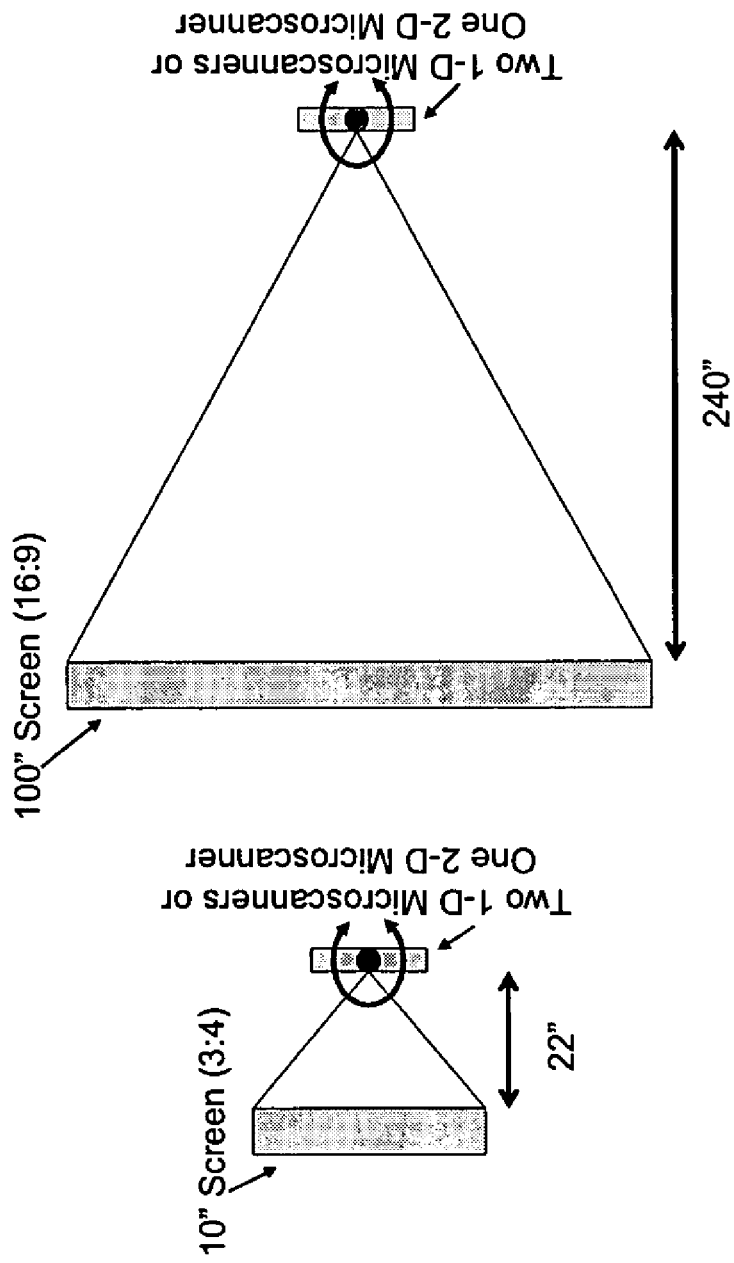
FIG. 7 is a schematic depiction of a large display system.

Pursuant to some embodiments of the present invention, the ablating laser pattern may be represented as a grayscale image in which ablation depth is proportional to the brightness of each pixel. A typical experimental setup that can be employed to produce the pattern is shown in FIG. 6. Two function generators, 600 and 601, may be used to drive the scanning mirrors, 602 and 603. Advantageously, mirrors 602 and 603 are oriented so as to rotate about substantially perpendicular axes, generating thereby two-dimensional scanning. A delay pulse generator, 604, triggered by the function generator serves as the laser pulse driver. In order for both function generators to remain synchronized so that the laser beam traces a circle, it is convenient to set up one function generator as the master, 600, triggering the other generator such that the scanners move 90 degrees out of phase. The amplitudes of the function generators signals determine the radius of the laser's circular motion, while the delay-pulse generator determines where the laser pulses on the circumference of its circular trajectory. The laser driver, 605, sets the intensity of the laser pulse. All systems may be conveniently controlled via a General Purpose Interface Bus, (GPIB) (e.g., IEEE488) as well as other types or methods of computer interface.

In some embodiments of the present invention, a two-part process comprising a calibration phase and then a writing phase was used. The calibration phase may produce a correspondence between the driving parameters and the laser spot location and amplitude. This phase is described in more detail herein. The writing phase may use this correspondence to write the designated pattern. This phase is described in more detail herein The calibration phase comprises writing a set of spots on the CCD over a range of driving parameters, measuring the location and intensity of each spot's intensity centroid, and then interpolating the set of values to determine what driving parameters and spot intensities are associated with every pixel on the CCD. A beam splitter, 606, is used to direct the beam to either the CCD, 607, or the intended target, 608.

Typically, the frequencies of the two function generators may be set (which drive the two torsional scanners) as well as the phase delay between the two frequencies such that the laser substantially follows an ideal or near-ideal circular path on the CCD.

The laser may be fired at several points along its path by setting the delay pulse generator to pulse through a range of time offsets. For each set of driving amplitudes and delay pulse timings, the laser may be activated for a fixed amount of time and exposed to the CCD. From the data collected by the CCD, the maximum amplitude of each laser spot and its centroid position on the CCD may be determined. Once the spot location for each set of amplitudes and delays have been determined, they may be interpolated to correlate the pixel locations on the CCD with the amplitude and delay driving values for the function and delay pulse generators. For a given driving amplitude and delay pulse timing, all laser pulses should hit the CCD at as close to the same point as is technically feasible. Due to vibrations and/or random noise, each pulse may experience slight variations in intensity and/or location on the CCD. It is advantageous in some embodiments of the present invention to average over several of these pulses for each driving amplitude and delay pulse timing.

Typically, a separate run may be made to determine the laser spot intensity versus the laser driving value. This data may be combined with the interpolated data of intensities from the previous calibration step. This allows one to determine the laser driving value required to achieve the desired spot intensity for all spot positions on the CCD.

Having determined some operating characteristics of the control system, one may repeat the calibration procedures with a different range of driving amplitudes and delays, thereby refining the measurement of the control system. This recalibration procedure may be particularly advantageous in the case that the first pass did not contain enough spot measurements over appropriate parts of the CCD.

To ablate the pattern, one may iterate through each pixel of the grayscale image, determine the laser driver amplitude, function generator amplitude, and delay values, and then pulse the laser for a time proportional to the amount of ablation specified by the grayscale image.

Modulating a train of high-energy pulses in a short period may increase the temperature of the microscanners causing shifts in the resonant frequencies and amplitudes as well as increases in optical distortions and aberrations. In worst cases, the reflection coatings on the microscanners' surfaces may be damaged due to very high temperatures. To reduce or prevent the damaging effects of heating in some embodiments of the present invention, sensors comprising resistance-detector temperature sensors (RTD) may be integrated on the mirror surface. Also, the RTD could be integrated onto the back surface of the mirror. RTDs may typically be made of sputtered platinum, but other materials may also be employed. The measured temperatures may be used by the control system to prevent damage, failure, or performance degradation to the microscanners.

Other ways exist to measure the temperature of the microscanner. For example, one can measure the electrical resistance through the mirror, between one torsion beam to the other torsion beam of the microscanner. With increasing temperature, more carriers become available in typical semiconducting materials and, thus, the resistance decreases. This correlation of electrical resistance with temperature can be used to estimate the temperature of the semiconducting material, perhaps including the addition of dopants to the semiconductor to facilitate changes in electrical resistance with temperature.

Two orthogonally aligned microscanners (or one 2-D microscanner) may be used to create a portable raster-scanning display system that may be integrated or added to small portable devices (e.g., a wrist-watch or other hand-held computing/communicating devices such as laptop computers, PDAS, cell-phones among others). By integrating one slow microscanner (for example, with resonant frequency, $f_r$, approximately 60 Hz), one fast microscanner (for example, having $f_r$ approximately 20 kHz), and laser diodes onto a hand-held device, one may create a high-resolution, projection-display system.

Other applications of microscanners as described herein pursuant to some embodiments of the present invention relate to large panel or slim panel display systems utilizing one or more microscanners. A typical display system is depicted schematically in FIG. 7 in which, for a given scanning angle, it is clear that the distance of the scanner from the display must be sufficiently large so the scanner covers the full area of the display onto which an image is to be projected. Thus, large panel display tend to be thick.

Figure 8:
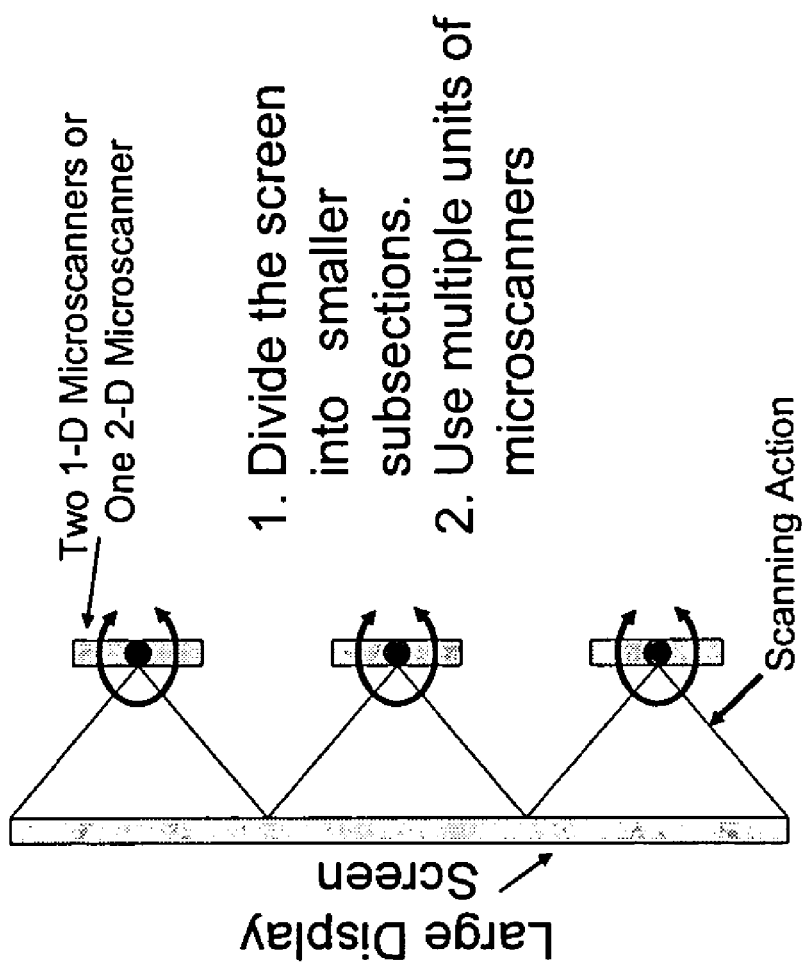
FIG. 8 is a schematic side view depiction of a slim-panel large display (typically high definition of HD) utilizing a plurality of 1D or 2-D microscanner to cover the entire display.
Figure 9:
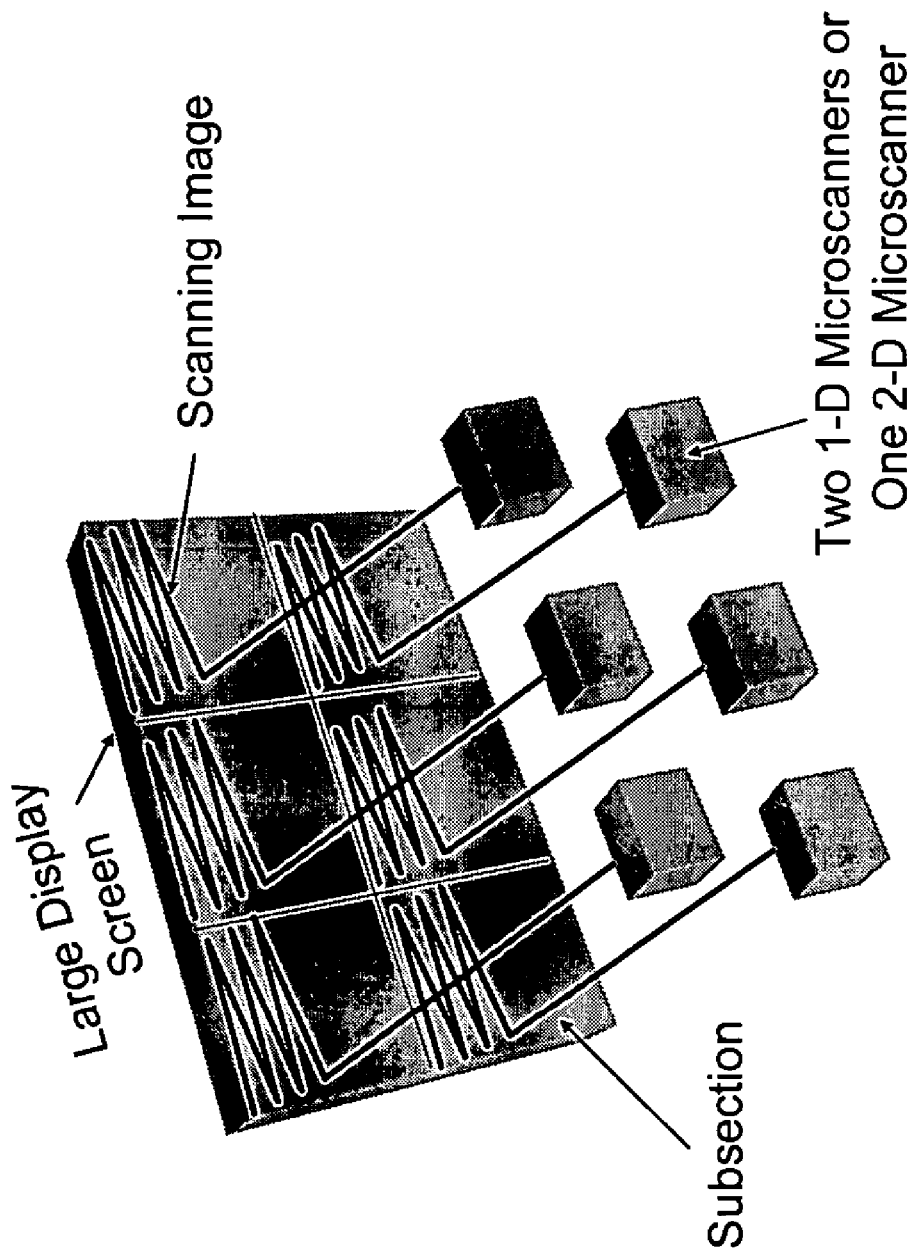
FIG. 9 is a schematic perspective depiction of a large display screen employing a plurality of 1-D or 2D microscanners.

Some approaches to fabrication of large panel displays are depicted in FIG. 8 and FIG. 9 in which multiple microscanners are employed. Each microscanner thus is required to scan only a portion of the display, permitting each scanner to be located in closer proximity to the display panel, resulting in a slimmer display. The image can thus be stitched together from a plurality of subimages, each subimage created by projection from at least one microscanner. That is, a single microscanner can be used to create each subimage, or multiple microscanners assembled into a scanner subsystem can be used for the creation of each subimage. In either case, the full display may be covered with a continuous image without requiring a large stand-off distance for the scanning apparatus.

Some embodiments of the present invention relate to structures, fabrication methods, systems and applications of a two-dimensional microscanner fabricated onto a single chip. A schematic depiction of a two-dimensional microscanner pursuant to some embodiments of the present invention is given in top view FIG. 11. The example depicted in FIG. 11 and described herein related to a microscanner suited for two-dimensional raster scanning. Other designs and configurations can be produced as straight-forward modifications of the structures and processes described herein.

Figure 11:
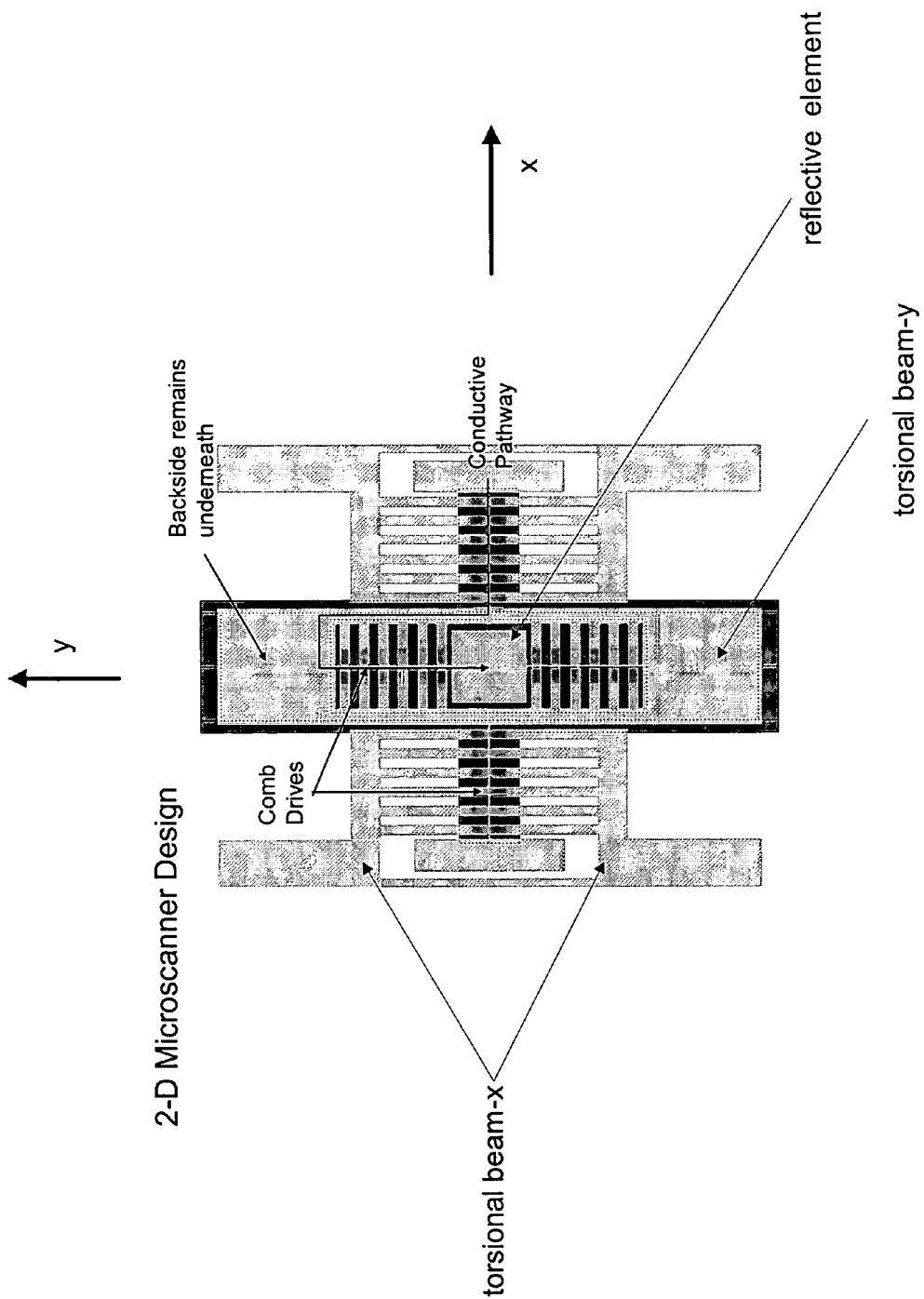
FIG. 11 is a top view schematic depiction of a 2-D raster scanner fabricated onto a single chip.

Sets of offset comb drives are depicted along torsional beams in two different directions, advantageously substantially perpendicular as depicted by X and Y axes in FIG. 11. A Z axis is envisioned (but not shown in FIG. 11) perpendicular to the plane of the figure in the conventional right-hand sense, that is positive Z direction is from the plane of the page towards the viewer.

A conventional 2-D raster scan employs a faster scanning direction (high frequency) and, substantially perpendicular thereto, a lower frequency, slower scanning direction. As depicted in FIG. 11, the slower scanning speed is performed by rotation about the X axis and the faster scanning speed results from rotation about the Y axis. For example, rotation about the X axis occurs at about 60 Hz and involves rotation of torsional beam-y and the reflective element contained thereon. Thus, two substantially perpendicular torsional rotations occur and, advantageously, the slower motion involves the movement of the larger mass. The backside etch occurs beneath the structure depicted in FIG. 11 (negative Z direction).

Since the backside region is maintained accessible, multiple electrical pathways can be introduced, permitting the 2-D scanning of this device to be achieved. Thus, electrical isolation between X-and Y-axis rotations is to be maintained.

References

The contents of all references are included herein by reference for all purposes.

[1]. R. A. Conant, J. T. Nee, K. Y. Lau, and R. S. Muller, "A flat high-frequency scanning micromirror," Hilton Head Solid-State Sensor and Actuator Workshop 2000, pp. 6-9, Transducer Research Foundation, Cleveland, Ohio, USA.

[2]. P. R. Patterson, D. Hah, H. Nguyen, H. Toshiyoshi, R. Chao, and M. C. Wu, "A scanning micromirror with angular comb drive actuation.", International Conference on Micro Electro Mechanical Systems 2002, pp. 544-7, Las Vegas, Nev., USA.

[3]. J. Kim, H. Choo, L. Lin, and R. S. Muller, "Microfabricated torsional actuator using self-aligned plastic deformation," IEEE Transducers 2003, pp. 1015-1018, Boston, Mass., USA.

[4]. D. T. McCormick and N. C. Tien, "Multiple Layer Asymmetric Vertical Comb-Drive Actuated Trussed Scanning Mirrors," IEEE/LEOS International Conference on Optical MEMS 2003, pp. 12-13, Waikoloa, Hi., USA.

[5]. J. F. Bille, C. F. H. Harner, and F. H. Loesel, "Aberration-Free Refractive Surgery," $2^{nd}$ Edition, Springer-Verlag, 2004, Chap. 10, New York, USA.

[6]. op. cit. Chap. 10, page 82.

[7]. J.-S. Wang, I.-W. Jung, O. Solgaard, "Fabrication method for elastomer spatial light modulators for short-wavelength maskless lithography," Sensors and Actuators: A Physical, Vol. 114, issue 2-3, 1 Sep. 2004, pp. 528-535.

[8]. K. F. Chan, Z. Feng, R. Yang, A. Ishikawa, and W. Mei, "High-resolution maskless lithography," Journal of Microlithography, Microfabrication, and Microsystems, Vol. 2, issue 4, October 2003, pp. 331-339.

Although various embodiments which incorporate the teachings of the present invention have been shown and described in detail herein, those skilled in the art can readily devise many other varied embodiments that still incorporate these teachings.

What is claimed is:

1. A method for fabricating an actuator device having vertically offset interdigitated-comb actuators including a fixed-comb actuator and a moving-comb actuator, comprising:
    forming a low temperature oxide layer on a semiconductor wafer; and,
    selectively removing said low temperature oxide layer at the locations of the fixed combs of said fixed-comb actuator; and,
    forming said fixed-comb actuator and said moving-comb actuator simultaneously by photolithographic patterning and etching; and,
    performing timed deep reactive ion etching to define the vertical height of said fixed-comb actuator without significantly affecting the height of said moving-comb actuator creating thereby vertically offset interdigitated-comb actuators; and,
    opening the backside of said actuator device and releasing said actuator device in an etch solution; and,
    wherein the temperature of said actuator device exceeds about 500 deg. C. at no time during the fabrication process.

2. A method as in claim 1 wherein said low temperature oxide layer has a thickness in the range from about 0.5 μm to about 1.0 μm.

3. A method as in claim 1 wherein the separation between the comb fingers of said actuators is in the range from about 0.014 μm to about 0.8 μm.

4. A method as in claim 1 further comprising:
    forming a mirror integrally with said moving-comb actuator thereby forming a microscanner.

\* \* \* \* \*